July 3, 1956 P. ORAZI ET AL 2,753,232
IMPROVEMENT IN PISTONS
Filed Nov. 14, 1951
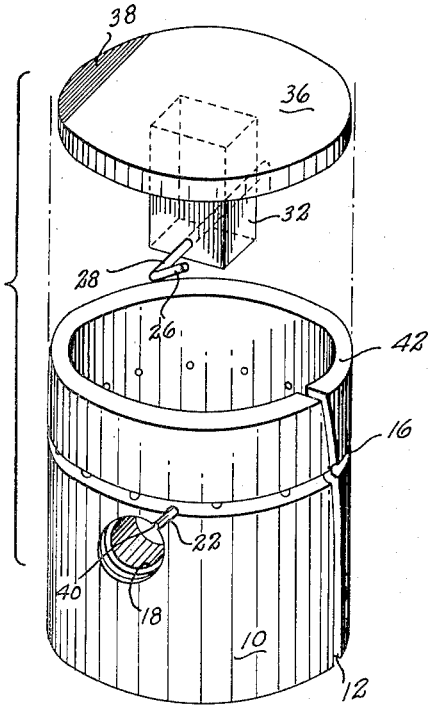
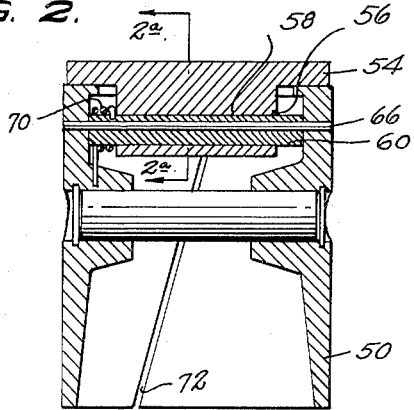
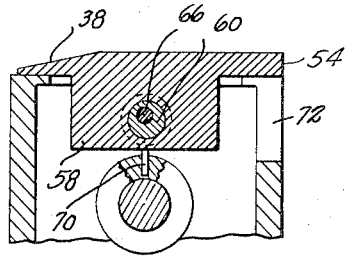
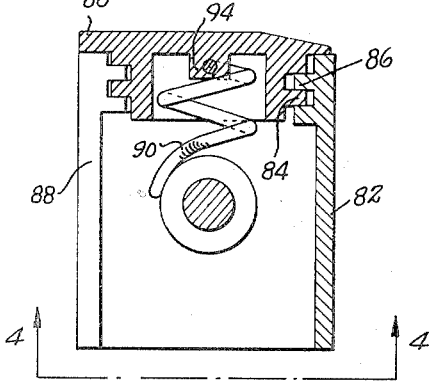
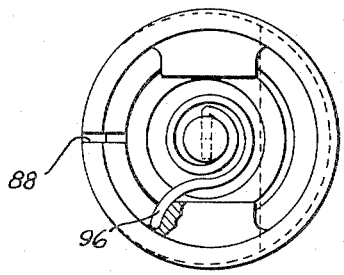
INVENTORS.
PAOLO ORAZI,
GIOVITA BETTINI,
BY
Albert M. Zalkind
ATTORNEY.

United States Patent Office 2,753,232
Patented July 3, 1956

2,753,232

IMPROVEMENTS IN PISTONS

Paolo Orazi and Giovita Bettini, Brescia, Italy

Application November 14, 1951, Serial No. 256,268

7 Claims. (Cl. 309—15)

This invention relates to pistons for internal combustion engines and more particularly to a piston which is elastically expansive to effect a seal with a cylinder wall.

Pistons of the type disclosed herein have been known heretofore. They are formed of a suitably flexible material having a longitudinal slit running the length of the piston skirt and having a separate head overlying the top edge of the skirt. One of the problems in conjunction with use of such a piston is gas leakage through the slit at the top edge of the skirt.

Our invention is directed toward providing a piston construction wherein leakage at the top edge of the skirt is prevented by means of a piston head articulated movably to the piston skirt and biased in the direction of the slit so as to overlay it at the top edge of the skirt whereby leakage through the slit is prevented.

The novel structure will be described in conjunction with the appended drawing in which:

Fig. 1 is a perspective of one form of the invention.

Fig. 2 is a longitudinal elevation in section of another form of the invention.

Fig. 2a shows a detail of the modification of Fig. 2.

Fig. 3 is a fragmentary longitudinal elevation in section of a third form of the invention.

Fig. 4 is a bottom view in the direction 4—4 of Fig. 3.

Referring now to Fig. 1 the invention comprises a piston body 10 of the usual cylindircal shape having a longitudinal slit 12 extending therethrough which slit may be slanted to some degree as illustrated. An oil groove 16 may be provided in the piston body together with apertures 18 to receive a piston pin. Extending secantially from aperture 18 is a groove 22. Groove 22 is for the purpose of accommodating the bent end 26 of a rod 28 of resilient spring metal. The rod 28 is carried in a block 32, passing through the block, which block is integral with a piston cap 36 which will be understood to be slightly smaller than the bore of a cylinder in which the piston is to be used. The piston cap 36 preferably has a marginal portion ground to form a flat 38. The flat 38 is best shown in Fig. 2a and it will be noted by comparison with Fig. 1 that it is diametrically opposite the slit 12 for a purpose to be hereinafter described.

When the cap 36 is assembled to the piston body or skirt 10, the resilient rod or pin 28 passes through the lefthand aperture 18 and the bent end 26 locks in the groove 22 formed in the piston body. It will be understood that aperture 18 through which the pin 28 passes is suitably notched at 40 to accommodate the body of the pin. The groove 22 may extend into the oil groove 16, if desired, so as to provide a passage for oil from the wrist pin (not shown) in aperture 18.

It will thus be apparent from the foregoing description that the cap 36 will be seated on the piston skirt edge 42 and by virtue of the resilience of the pin 28 the cap 36 will be biased forwardly as viewed on Fig. 1, that is, toward the slit 12, so that the cap fully covers the top edge 46 of the slit 12. Thus as the piston rides up and down the cylinder under gas compression the slit 12 is always sealed at its top edge 46 by the cap 36 to prevent gas leakage, the side surface of the cap which is adjacent the slit 12 being maintained in contact with the cylinder wall.

In addition to the pin 28 a further expedient is provided to maintain a bias on the cap 36 so that it will always overlay the opening 46, viz., the flat 38 which is subjected to gas pressure in the cylinder. The slope of the surface of the flat 38 is such as to effect a horizontal component of the gas pressure acting on the surface of the cap. This horizontal component of gas pressure is in such a direction as to bias the cap 36 toward the slit 12. Thus, gas pressure is used to assist in maintaining the cap 36 over the opening 46.

In the form of the invention shown in Fig. 2 the piston skirt 50 carries a piston cap 54 having a bore 56 in a central boss 58, in which bore an eccentric pin 60 is disposed. Attention is invited to Fig. 2a to show this relationship.

The pin 60 carries eccentrically another pin 66 which has bearing support in suitably provided apertures at diametrically disposed points in the piston skirt, as shown in Fig. 2. Thus, any force tending to rotate the pin 60 would cause a shifting of the piston cap 54. In order to provide such a biasing force for the piston cap a spring 70 is disposed with a number of coils around the pin 60, one end of the spring being fastened to the pin and the other end being fastened to the piston skirt. The spring is wound in such a direction as to maintain a constant biasing force tending to rotate the pin 60 to effect a bias on the piston cap 54 in a direction to insure coverage of the slit 72 in the piston skirt.

In the forms of the invention thus far described the piston caps are maintained on the piston skirts by separate members. Thus, in Fig. 1 the pin 28 serves to hold the piston cap into adherence with the skirt while in the form of the invention shown n Fig. 2 the pin 66 serves this purpose.

In the form of the invention shown in Fig. 3 the cap 80 is maintained on the skirt 82 by being loosely threaded thereto. Thus, the threads 84 of the cap co-act with the threads 86 of the skirt in such a way that the cap 80 has a suitable degree of lateral shifting with respect to the skirt so that it may be moved to cover the slit 88 disposed in the skirt as shown in Fig. 4. In order to bias the cap 80 toward the left (as viewed in Fig. 4) to insure coverage of the split 88, a helical spring 90 is utilized which is spirally wound about a hub 94 centrally disposed with respect to the cap and integral therewith. Thus, one end of the spring is fastened in the hub 94 while the other end is fastened to the piston skirt wall at 96 as shown. The direction of spiralling of the spring 90 is such as to maintain a direction of rotation of the cap 80 so that it will be maintained by virtue of the threads against the top edge of the piston skirt 82. At the same time the spring 90 effects a lateral bias of the piston cap so that one edge thereof will at all times cover the slit 88. As in the preceding modifications, gas leakage is thus prevented from passing through the slit 88, the piston cap being biased against the cylinder wall (not shown) directly over the slit.

We are aware that variations may be made of our invention and accordingly do not seek to be limited to the modifications hereinabove disclosed and described except as set forth in the following claims.

We claim:

1. A piston comprising a head and a skirt, said skirt being provided with slit means to afford radial expansion wherein said slit means extends to and emerges at the top edge of said skirt, being covered thereat by said head; said head and skirt having loose threaded engagement so as to effect radial relative motion therebetween; resilient means biasing said head and skirt rotatively relative each other so as to effect a tight engagement therebetween through said threaded engagement.

2. A piston as set forth in claim 1, said resilient means being disposed to bias said head transversely of said skirt in a radial direction relative thereto to insure coverage of said slit means by said head, wherein the direction of transverse bias is substantially in the plane of said head to insure covering of said slit means at the top edge of said skirt, said resilient means being effective to bias said head against the wall of a cylinder in which said piston may be disposed.

3. A piston as set forth in claim 2, wherein said resilient means comprises a spring spirally disposed about the axis of said piston and having one end secured to said skirt and another end secured to said head, the direction of spiralling of said spring being such as to effect a radial component of force for biasing said head in the direction of said slit means, and wherein the direction of spiralling of said spring effects rotative bias on said head in a direction to tighten said head on said skirt by virtue of the threaded engagement therebetween.

4. A piston comprising a head and a skirt, a slit in said skirt extending to a top edge thereof and emerging thereat, said head being disposed on said skirt and covering said slit, and resilient means disposed within said piston biasing said head in radial direction so as to insure covering of said slit where it emerges at the edge of said skirt.

5. A cylinder, a piston in said cylinder comprising a head and skirt, a slit in said skirt extending to a top edge thereof and emerging thereat, said head being disposed on said skirt and covering said slit, and resilient means disposed within said piston biasing said head in a radial direction so as to insure covering of said slit where it emerges at the edge of said skirt, said head having a sufficient degree of motion relative said skirt in a radial direction as to be engageable with the internal surface of said cylinder at a point where said internal surface is engaged by the uppermost portion of the skirt adjacent said slit, wherein said resilient means effects maintenance of engagement between said head and said internal surface of said cylinder so as to fully seal said slit to prevent leakage of gases therethrough.

6. A piston comprising a head and a skirt, a slit in said skirt extending to a top edge thereof and emerging thereat, said head being disposed on said skirt and covering said slit, and resilient means disposed within said piston biasing said head in a radial direction so as to insure covering of said slit where it emerges at the edge of said skirt, said resilient means comprising a spring spirally arranged about the axis of said piston and having one end secured to said skirt and the other end secured to said head, the direction of spiralling of said spring being such as to effect radial bias on said head toward said slit to insure covering thereof.

7. A piston as set forth in claim 4, said head having an area non-planar with the top surface thereof disposed so as to effect a component of radial force of gas pressure on said head in the direction of said slit to augment the force of said resilient means in maintaining said head in position covering said slit.

References Cited in the file of this patent

UNITED STATES PATENTS

| | | |
|---|---|---|
| 1,222,413 | King | Apr. 10, 1917 |
| 1,368,167 | Laneville | Feb. 8, 1921 |
| 1,393,285 | Hobbs | Oct. 11, 1921 |
| 1,430,010 | Hartog | Sept. 26, 1922 |
| 1,446,601 | Warren | Feb. 27, 1923 |
| 1,683,380 | Brockmeyer | Sept. 4, 1928 |
| 1,743,323 | Cotter | Jan. 14, 1930 |
| 1,773,372 | Nelson | Aug. 19, 1930 |
| 1,789,570 | Teetor | Jan. 20, 1931 |
| 1,812,391 | Zechlau | June 30, 1931 |
| 1,842,022 | Hartog | Jan. 19, 1932 |
| 1,938,826 | Frank | Dec. 12, 1933 |
| 2,044,499 | Agostino | June 16, 1936 |
| 2,069,437 | Frank | Feb. 2, 1937 |
| 2,174,417 | Hallstead | Sept. 26, 1939 |
| 2,428,983 | Neeley | Oct. 14, 1947 |

FOREIGN PATENTS

| | | |
|---|---|---|
| 248,279 | Italy | May 12, 1926 |